US012105591B2

(12) United States Patent
Chen et al.

(10) Patent No.: US 12,105,591 B2
(45) Date of Patent: Oct. 1, 2024

(54) REDUNDANT DATA CALCULATION METHOD AND APPARATUS

(71) Applicant: HUAWEI TECHNOLOGIES CO., LTD., Shenzhen (CN)

(72) Inventors: Can Chen, Chengdu (CN); Hongdong Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 17/731,566

(22) Filed: Apr. 28, 2022

(65) Prior Publication Data

US 2022/0253356 A1 Aug. 11, 2022

Related U.S. Application Data

(63) Continuation of application No. PCT/CN2020/121198, filed on Oct. 15, 2020.

(30) Foreign Application Priority Data

Nov. 6, 2019 (CN) .......................... 201911076571.2

(51) Int. Cl.
  *G06F 11/00* (2006.01)
  *G06F 11/10* (2006.01)
(52) U.S. Cl.
  CPC ...... *G06F 11/1092* (2013.01); *G06F 11/1064* (2013.01); *G06F 2211/1009* (2013.01)

(58) Field of Classification Search
  CPC ............. G06F 11/1092; G06F 11/1064; G06F 11/1076; G06F 11/10; G06F 11/1004; G06F 11/0727; G06F 11/1044; G06F 2211/1009
  See application file for complete search history.

(56) References Cited

U.S. PATENT DOCUMENTS

| 5,996,046 | A | * | 11/1999 | Yagisawa | ............ | G06F 11/1076 |
| | | | | | | 714/766 |
| 6,006,308 | A | * | 12/1999 | Matsunami | ......... | G06F 11/1076 |
| | | | | | | 711/112 |
| 6,094,728 | A | * | 7/2000 | Ichikawa | ............... | G06F 3/0689 |
| | | | | | | 714/E11.034 |
| 6,912,687 | B1 | * | 6/2005 | Gates | ................... | G06F 11/1076 |
| | | | | | | 714/6.24 |
| 9,842,024 | B1 | | 12/2017 | David et al. | | |

(Continued)

FOREIGN PATENT DOCUMENTS

| CN | 102609221 A | 7/2012 |
| CN | 103049220 A | 4/2013 |

(Continued)

*Primary Examiner* — Joseph D Manoskey
(74) *Attorney, Agent, or Firm* — Maier & Maier, PLLC

(57) ABSTRACT

A redundant data calculation method and apparatus. The method is applied to the redundant data calculation apparatus including a processor and a redundant data calculation unit. In the method, after obtaining to-be-processed data, the processor stores the to-be-processed data in cache space of the redundant data calculation unit. The redundant data calculation unit obtains the to-be-processed data from the cache space and performs calculation for checking the to-be-processed data to obtain redundant data corresponding to the to-be-processed data.

20 Claims, 6 Drawing Sheets

(56) References Cited

U.S. PATENT DOCUMENTS

| | | | |
|---|---|---|---|
| 2010/0037117 A1* | 2/2010 | Pescatore | H03M 13/13 714/752 |
| 2015/0089328 A1 | 3/2015 | Lee et al. | |
| 2019/0042518 A1* | 2/2019 | Marolia | G06F 13/4221 |
| 2019/0171522 A1 | 6/2019 | Chang et al. | |
| 2019/0265890 A1 | 8/2019 | Barajas et al. | |

FOREIGN PATENT DOCUMENTS

| | | |
|---|---|---|
| CN | 103077095 A | 5/2013 |
| CN | 104461373 A | 3/2015 |
| CN | 107885614 A | 4/2018 |
| CN | 109308288 A | 2/2019 |
| CN | 109358809 A | 2/2019 |
| CN | 107250975 B | 7/2020 |
| WO | 2016093797 A1 | 6/2016 |

* cited by examiner

REDUNDANT DATA CALCULATION METHOD AND APPARATUS

CROSS-REFERENCE TO RELATED APPLICATIONS

This application is a continuation of International Application No. PCT/CN2020/121198, filed on Oct. 15, 2020, which claims priority to Chinese Patent Application No. 201911076571.2, filed on Nov. 6, 2019. The disclosures of the aforementioned applications are hereby incorporated by reference in their entireties.

TECHNICAL FIELD

The embodiments relate to the field of storage technologies, and in particular, to a redundant data calculation method and apparatus.

BACKGROUND

In a storage system, a data redundancy technology may be used to ensure reliability of stored data, and the main principle is that to-be-stored data is split into a plurality of data pieces, then calculation for checking is performed on the plurality of data pieces, to obtain one or more pieces of redundant data, and the plurality of data pieces and the redundant data are stored on different disks. In this way, when a piece of data in the plurality of data pieces and the redundant data encounters a failure or is lost, other data can be used for recovering the lost data, to protect the data.

The data redundancy technology may be implemented by using a redundant array of independent disks (RAID) module in an array controller. FIG. 1 is a diagram of an example architecture of an array controller in the conventional technology. The array controller includes a processor and a plurality of RAID modules, and the processor is connected to a plurality of disk groups via the plurality of RAID modules. After the processor receives to-be-stored data, the processor first stores the to-be-stored data in memory, then determines, based on information such as a control policy or a type of the to-be-stored data, to send the to-be-stored data to one of the RAID modules for calculation for checking, and stores the to-be-stored data and redundant data obtained after the calculation for checking in a disk group managed by the RAID module.

In the conventional technology, a procedure of calculation for checking performed on to-be-stored data may be relatively complicated, causing a relatively long delay in a storage system.

SUMMARY

Embodiments provide a redundant data calculation method and apparatus, to streamline a procedure of calculation for checking and decrease a delay of a storage system.

According to a first aspect, a redundant data calculation method is provided. The method is applied to the redundant data calculation apparatus including a processor and a redundant data calculation unit. In the method, after obtaining to-be-processed data, the processor stores the to-be-processed data in cache space of the redundant data calculation unit. The redundant data calculation unit obtains the to-be-processed data from the cache space and performs calculation for checking the to-be-processed data to obtain redundant data corresponding to the to-be-processed data.

In the foregoing solution, after obtaining the to-be-processed data, the processor can directly store the to-be-processed data in the cache space of the redundant data calculation unit, so that steps for storing the to-be-processed data in a memory of the processor and transferring the to-be-processed data from the memory to the cache space of the redundant data calculation unit are reduced, thereby streamlining a procedure of calculation for checking and decreasing a processing delay.

The redundant data calculation unit may perform calculation for checking the to-be-processed data to obtain the redundant data corresponding to the to-be-processed data in, but not limited to, the following two manners:

In a first manner, the redundant data calculation unit performs, based on a preset checking algorithm, calculation for checking the to-be-processed data to obtain the redundant data corresponding to the to-be-processed data.

The foregoing manner can be implemented relatively easily and can reduce interaction procedures.

In a second manner, the processor first sends, to the redundant data calculation unit, first information used to indicate a checking algorithm, and then the redundant data calculation unit performs, based on the checking algorithm indicated by the first information, calculation for checking the to-be-processed data to obtain the redundant data.

In the foregoing manner, the processor can flexibly select a checking algorithm to use, and flexibility in this method can be improved.

The redundant data calculation apparatus may further include a storage apparatus, and after the redundant data calculation unit obtains the redundant data, the processor stores the to-be-processed data and the redundant data in the storage apparatus.

The processor may store the to-be-processed data and the redundant data in the storage apparatus through running preset code, a software program, or the like. Alternatively, the processor may send a storage instruction to the storage apparatus, and after the storage apparatus receives the storage instruction, a direct memory access (DMA) engine obtains, according to the storage instruction, the to-be-processed data and the redundant data from the cache space, to store the to-be-processed data and the redundant data in the storage apparatus.

After determining that target data stored in the storage apparatus is lost, the processor may store remaining data corresponding to the target data in the cache space. Then, the redundant data calculation unit performs calculation for checking the remaining data to obtain the target data and stores the target data in the cache space. The processor then stores the remaining data and the target data in the storage apparatus.

In the foregoing solution, when data is lost, the redundant data calculation unit can alternatively be configured to recover the lost data, and because in the foregoing process, only transferring data from the storage apparatus to the cache space is required, a processing procedure is simple, so that a processing delay can be decreased, thereby improving processing efficiency.

The cache space may consume a part of memory of the processor.

In other words, the cache space of the redundant data calculation unit may be implemented by consuming a memory or may be implemented by using an independently configured cache unit. This is not limited herein.

The processor and the redundant data calculation unit may communicate with each other through a data consistency protocol, to ensure that the processor can access the cache space of the redundant data calculation unit.

The storage apparatus may include one or more redundant units. When the storage apparatus includes a plurality of redundant units, the redundant data calculation unit calculates redundant data for to-be-processed data in the plurality of redundant units in the storage apparatus, where checking algorithms used by the plurality of redundant units are different.

In the foregoing solution, the redundant unit included in the storage apparatus may be configured based on requirements on use and is not limited by the redundant data calculation unit. When the storage apparatus includes only one redundant unit, data redundancy can be implemented in a whole system. When the storage apparatus includes a plurality of redundant units, the redundant data calculation unit calculates, based on a checking algorithm corresponding to each redundant unit, redundant data for the redundant unit.

According to a second aspect, a redundant data calculation apparatus is provided. The redundant data calculation apparatus may be a storage node or an array controller or may be an apparatus in the storage node or the array controller. The redundant data calculation apparatus includes a processor, configured to implement the method performed by the processor in the first aspect. The redundant data calculation apparatus may further include a storage, configured to store program instructions and data. The memory is coupled to the processor, and the processor may invoke and execute the program instructions stored in the memory, to implement any one of the methods described in the first aspect. The redundant data calculation apparatus may further include a redundant data calculation unit, configured to calculate redundant data.

The redundant data calculation apparatus may include the processor and the redundant data calculation unit.

The processor is configured to: obtain to-be-processed data and store the to-be-processed data in cache space of the redundant data calculation unit.

The redundant data calculation unit is configured to: obtain the to-be-processed data from the cache space and perform calculation for checking the to-be-processed data to obtain redundant data corresponding to the to-be-processed data.

The redundant data calculation unit may be configured to: perform, based on a preset checking algorithm, calculation for checking the to-be-processed data to obtain the redundant data corresponding to the to-be-processed data.

Alternatively, the processor is further configured to send first information to the redundant data calculation unit, where the first information is used to indicate a checking algorithm.

The redundant data calculation unit is configured to perform, based on the checking algorithm indicated by the first information, calculation for checking the to-be-processed data to obtain the redundant data.

he redundant data calculation apparatus may further include a storage apparatus, and the processor is further configured to store the to-be-processed data and the redundant data in the storage apparatus.

The processor may be configured to:
send a storage instruction to the storage apparatus, where a direct memory access DMA engine of the storage apparatus obtains the to-be-processed data and the redundant data from the cache space.

The processor may be further configured to:
when determining that target data stored in the storage apparatus is lost, store remaining data corresponding to the target data in the cache space.

The redundant data calculation unit is further configured to perform calculation for checking the remaining data to obtain the target data and store the target data in the cache space.

The processor is further configured to store the remaining data and the target data in the storage apparatus.

The cache space may consume a part of memory of the processor.

The processor and the redundant data calculation unit may communicate with each other through a data consistency protocol.

The redundant data calculation unit may be configured to:
calculate redundant data for to-be-processed data in a plurality of redundant units in the storage apparatus, where checking algorithms used by the plurality of redundant units are different.

According to a third aspect, a redundant data calculation apparatus is provided. The redundant data calculation apparatus may be a storage node or an array controller or may be an apparatus in the storage node or the array controller. The redundant data calculation apparatus may include a processing module and a redundant data calculation module, and the modules may perform a corresponding function performed in any one of the examples in the first aspect.

The processing module is configured to: obtain to-be-processed data and store the to-be-processed data in cache space of the redundant data calculation module.

The redundant data calculation module is configured to: obtain the to-be-processed data from the cache space and perform calculation for checking the to-be-processed data to obtain redundant data corresponding to the to-be-processed data.

According to a fourth aspect, an embodiment provides a computer-readable storage medium, where the computer-readable storage medium stores a computer program, and the computer program includes program instructions. When the program instructions are executed by a computer, the computer is enabled to perform any method according to the first aspect.

According to a fifth aspect, an embodiment provides a computer program product, where the computer program product stores a computer program, and the computer program includes program instructions. When the program instructions are executed by a computer, the computer is enabled to perform any method according to the first aspect.

According to a sixth aspect, a chip system includes a processor, may further include a memory, and is configured to implement the method according to the first aspect. The chip system may include a chip or may include a chip and another discrete component.

According to a seventh aspect, an embodiment provides a storage system, where the storage system includes the redundant data calculation apparatus according to any one of the implementations in the second aspect or the second aspect; or the storage system includes the redundant data calculation apparatus according to any one of the implementations in the third aspect or the third aspect.

For beneficial effects of the second aspect to the seventh aspect and the implementations thereof, reference may be made to descriptions of beneficial effects of the method and the implementations thereof in the first aspect.

DETAILED DESCRIPTION OF THE EMBODIMENTS

To make the objectives, solutions, and advantages of embodiments clearer, the following describes the solutions in the embodiments in detail with reference to the accompanying drawings.

In the embodiments, "a plurality of" means two or more. In view of this, in the embodiments, "a plurality of" may also be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects, unless otherwise specified.

Unless otherwise specified, ordinal terms such as "first" and "second" mentioned in the embodiments are used to distinguish a plurality of objects, but are not used to limit a sequence, a time sequence, a priority, or a level of importance among the plurality of objects.

The method in the embodiments may be applied to a storage system. The storage system may be a distributed storage system or may be a centralized storage system. The storage system may be a file storage system, a block storage system, an object storage system, or a combination of the foregoing storage systems. This is not limited in the embodiments.

Figure 1:
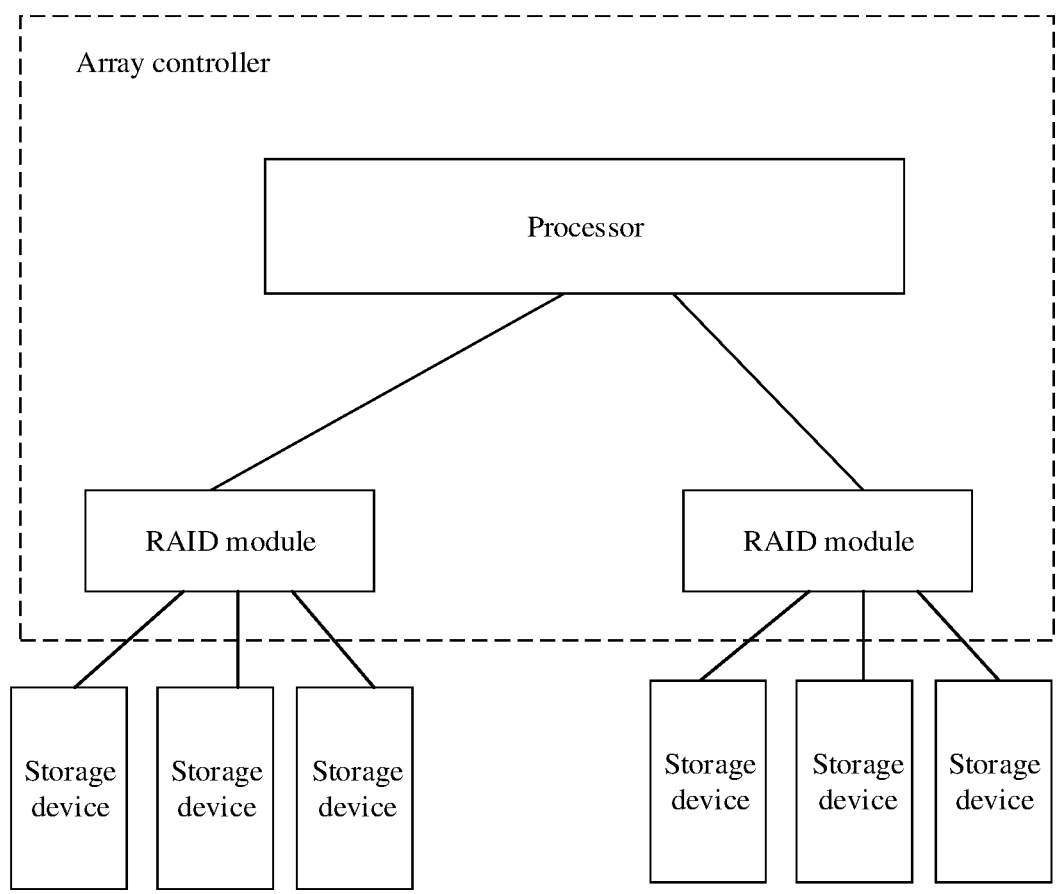
FIG. 1 is a diagram of an example architecture of an array controller in the conventional technology.
Figure 2A:
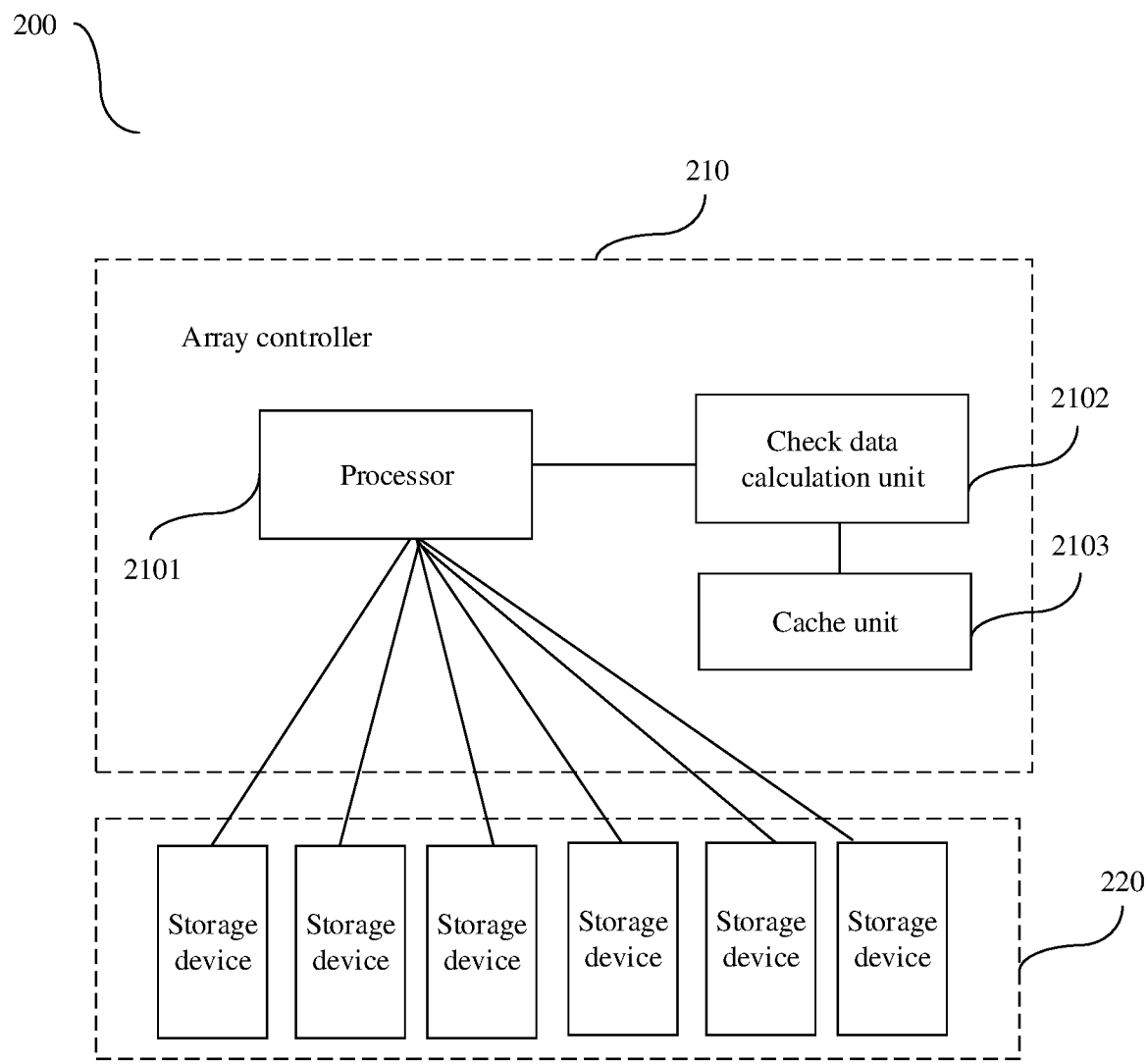
FIG. 2A is a diagram of an example architecture of a storage system according to an embodiment.

FIG. 2A is a diagram of an example architecture of a storage system according to an embodiment. The storage system 200 shown in FIG. 2A includes an array controller 210 and a storage apparatus 220. The storage apparatus 220 includes at least one storage device. The storage device may be, for example, a serial advanced technology attachment (SATA) hard disk, a small computer system interface (SCSI) hard disk, a serial attached SCSI (SAS) hard disk, a fibre channel (FC) hard disk, a hard disk drive (HDD), or a solid state-drive (SD). The storage apparatus 220 stores data in at least one storage device according to an instruction of the array controller 210.

The array controller 210 includes a processor 2101, a redundant data calculation unit 2102 connected to the processor 2101, and a cache unit 2103 connected to the redundant data calculation 2102. The processor 2101 is configured to receive a data access request sent by a client connected to the storage system 200, where the data access request may be a data reading request, a data writing request, or the like. The cache unit 2103 is configured to store data that needs to be calculated for checking, and the redundant data calculation unit 2102 is configured to perform calculation for checking the data stored in the cache unit 2103 to obtain redundant data corresponding to the data, so that the data and the redundant data obtained through calculation based on the data are stored in a storage device in the storage apparatus 220. The processor 2101 may be a general-purpose central processing unit (CPU), an application-specific integrated circuit (ASIC), one or more integrated circuits configured to control program execution, a hardware circuit developed by using a field programmable gate array (FPGA), or a baseband processor. The redundant data calculation unit 2102 may be a RAID card or another module that can implement a data redundancy technology. The cache unit 2103 may be a non-volatile memory, for example, a non-volatile random access memory (NVRAM) or a flash (flash) memory.

In the storage system 200 shown in FIG. 2A, a connection location of the redundant data calculation unit 2102 is adjusted. The redundant data calculation unit 2102 is connected only to the processor 2101, and the processor 2101 is directly connected to the storage device in the storage apparatus 220. In an example, the processor 2101 and the redundant data calculation unit 2102 may communicate with each other through a data consistency protocol. For example, the processor 2101 and the redundant data calculation unit 2102 may be connected to each other through a quick path interconnect (QPI) bus, a Huawei cache-coherent system (HCCS) bus, or another high-speed bus. This is not limited herein.

In another example, the cache unit 2103 may alternatively be implemented by using a memory of the processor 2101. A part of the memory of the processor 2101 may be used as storage space of the cache unit 2103. In this case, the cache unit 2103 does not need to be independently configured for the redundant data calculation unit 2102. For ease of description, an example in which the cache unit 2103 (as shown in FIG. 2A) is independently configured is used below.

Figure 2B:
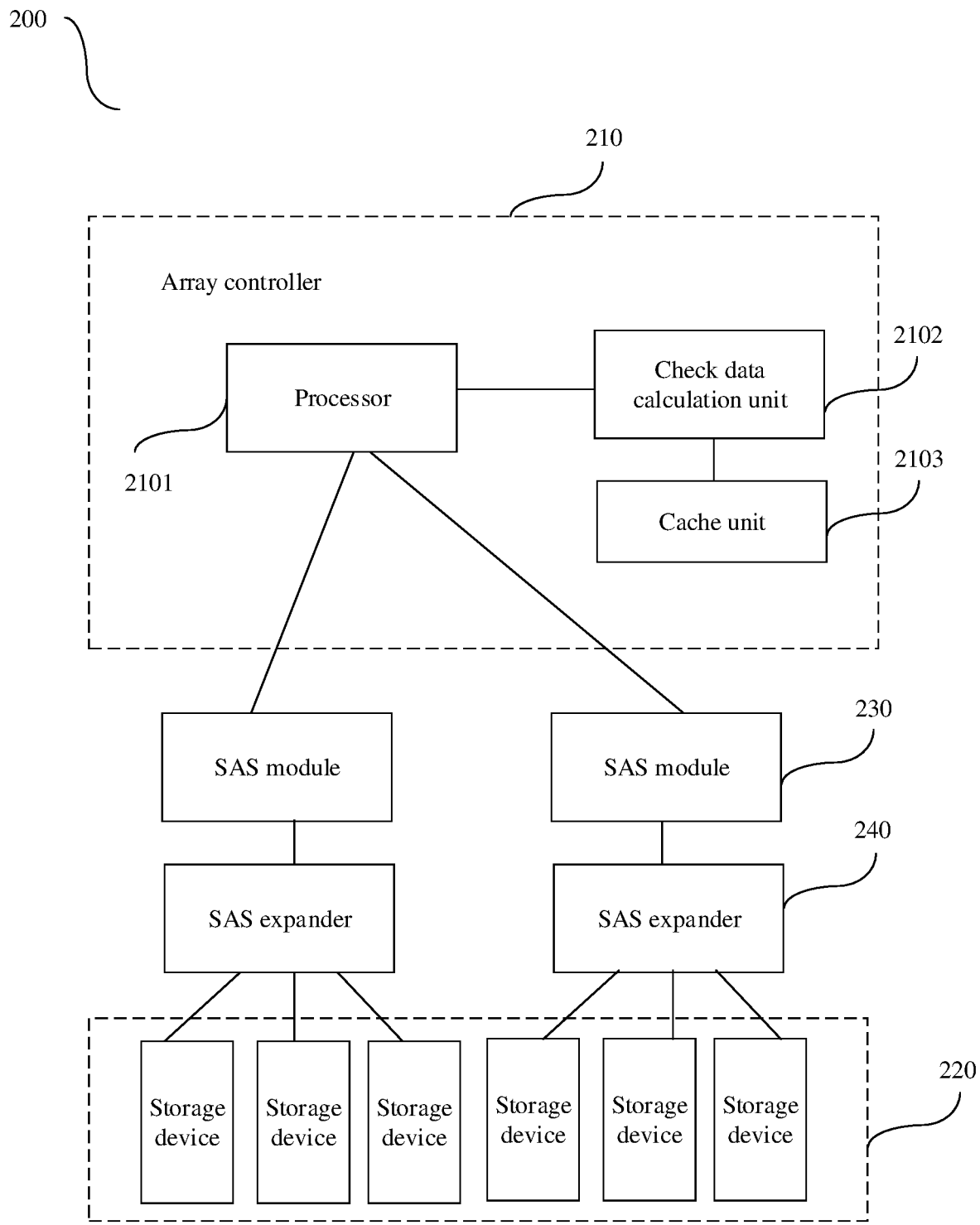
FIG. 2B is a diagram of another example architecture of a storage system according to an embodiment.

It should be noted that, in the storage system shown in FIG. 2A, although the array controller 210 and the storage apparatus 220 are shown, the architecture of the storage system may not be limited to the foregoing content. For example, in FIG. 2B, the storage system 200 may further include a SAS module 230 configured for protocol conversion and a SAS expander 240. The SAS module 230 and the SAS expander 240 are connected between the processor 2101 and the storage apparatus 220. The SAS module may convert a peripheral component interconnect express (PCIE) protocol into a SAS protocol, and the SAS expander 240 may enable the processor 2101 to be connected to more storage devices. The storage system may further include other content, and details are not described herein.

An example in which the redundant data calculation method provided in the embodiments is applied to the storage system shown in FIG. 2A is used for description below. In other words, the method can be performed by the array controller 210 in the storage system 200 shown in FIG. 2A. In the following, the array controller 210 is a redundant data calculation apparatus, the processor 2101 in the array controller 210 is a processor in the redundant data calculation apparatus, the redundant data calculation unit 2102 in the array controller 210 is a redundant data calculation unit in the redundant data calculation apparatus, and cache space of the redundant data calculation unit is storage space corresponding to the cache unit 2103 in the array controller 210.

Figure 3:
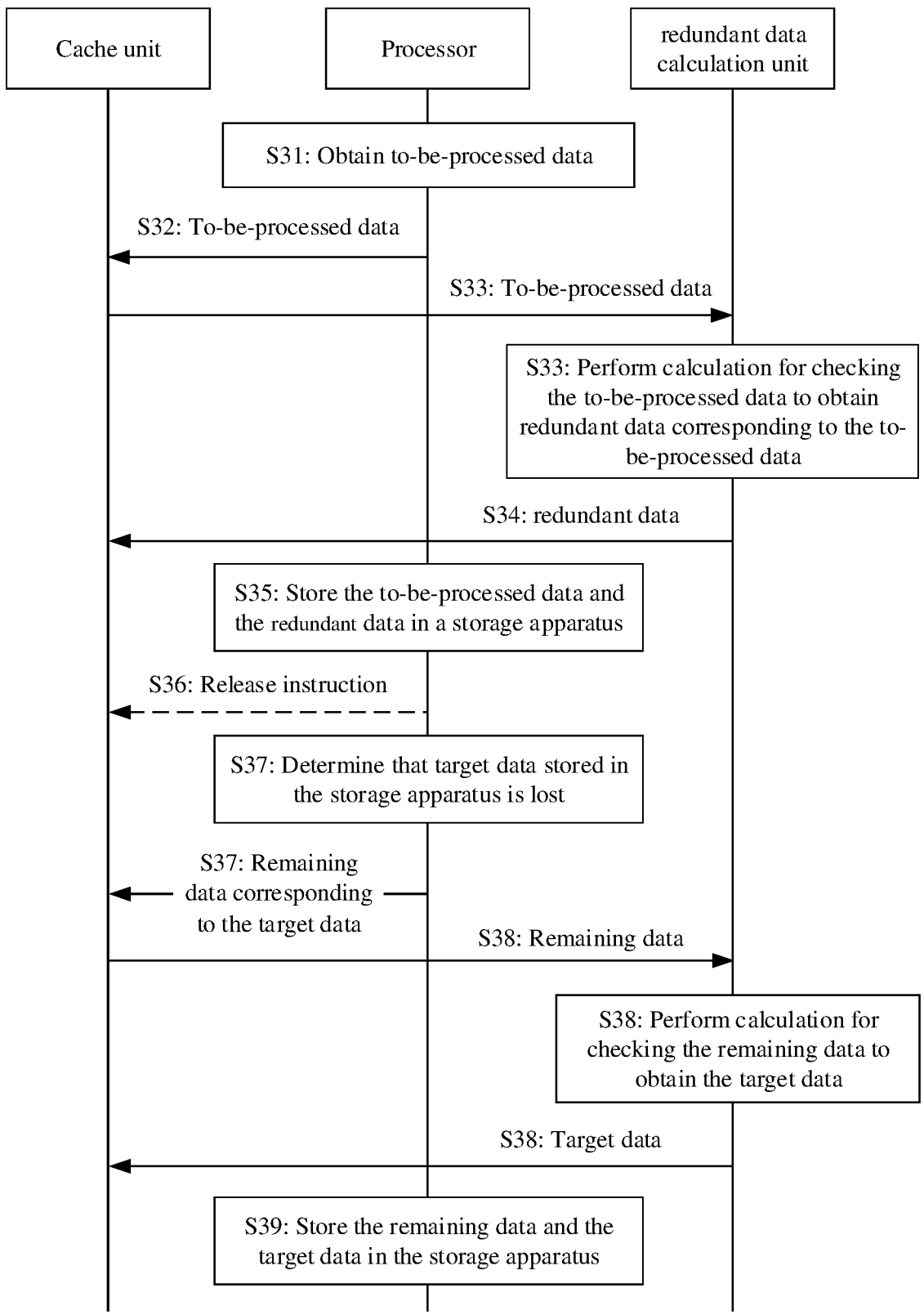
FIG. 3 is a flowchart of a redundant data calculation method according to an embodiment.

FIG. 3 is a flowchart of a redundant data calculation method according to an embodiment, and a description of the flowchart is as follows:

S31: The processor 2101 obtains to-be-processed data.

The to-be-processed data may be carried in the data writing request sent by the client connected to the storage system 200 or may be generated by the processor 2101 in a running process of the storage system 200, and for example, may be an analysis result obtained by analyzing user data. This is not limited herein.

S32: The processor 2101 stores the to-be-processed data in the storage space corresponding to the cache unit 2103.

In the storage system 200 shown in FIG. 2A, the cache unit 2103 is set to be accessed by the redundant data calculation unit 2102, and also to be accessed by the processor 2101. Therefore, in this embodiment, after obtaining the to-be-processed data, the processor 2101 can directly store the to-be-processed data in the storage space corresponding to the cache unit 2103, so that steps for storing the to-be-processed data in a memory of the processor 2101 and transferring the to-be-processed data from the memory to the cache unit 2103 are reduced, thereby streamlining a procedure of calculation for checking.

In an example, a size of the to-be-processed data is 8 kilobytes (KB), and an amount of stored data per storage unit in the storage space corresponding to the cache unit 2103 is 1 KB. The processor 2101 stores the to-be-processed data in eight storage units of the cache unit 2103 and obtains a storage address of the to-be-processed data in the cache unit 2103. The storage address includes an offset between a start address for storing the to-be-processed data and a start address of the cache unit 2103, and a data length. The data length may be a quantity of storage units occupied by the to-be-processed data. For example, if the start address for storing the to-be-processed data is the start address of the cache unit 2103, the offset is 0, and the to-be-processed data occupies eight storage units, so that the data length is 8. A start storage unit may be denoted as a storage unit 0.

S33: The redundant data calculation unit 2102 obtains the to-be-processed data from the cache space corresponding to the cache unit 2103 and performs calculation for checking the to-be-processed data to obtain redundant data corresponding to the to-be-processed data.

After the processor 2101 stores the to-be-processed data in the cache unit 2103, the processor 2101 may send a second instruction to the redundant data calculation unit 2102, where the second instruction may carry the storage address of the to-be-processed data in the cache unit 2103, to instruct the redundant data calculation unit 2102 to perform calculation for checking the to-be-processed data. After receiving the second instruction, the redundant data calculation unit 2102 obtains the to-be-processed data from the storage address indicated by the second instruction. Alternatively, after the cache unit 2103 detects that new data is stored in the storage space corresponding to the cache unit 2103, the cache unit 2103 may actively report a storage address corresponding to the new data to the redundant data calculation unit 2102. The redundant data calculation unit 2102 obtains the to-be-processed data based on the storage address reported by the cache unit 2103. The redundant data calculation unit 2102 may alternatively obtain the to-be-processed data in another manner. This is not limited herein.

After obtaining the to-be-processed data, the redundant data calculation unit 2102 performs calculation for checking the to-be-processed data to obtain redundant data corresponding to the to-be-processed data. First, a checking algorithm in this embodiment is described.

From the foregoing description in data redundancy technology, data may need to be split and redundant data may be calculated based on the split data. Therefore, the checking algorithm may be understood as an algorithm for splitting data and an algorithm for calculating redundant data. A RAID technology may be classified into seven levels, that is, RAID 0 to RAID 6. Different RAID levels correspond to different algorithms. In this case, the checking algorithm may be algorithms corresponding to different RAID levels. Alternatively, erasure coding (EC) may be used to perform calculation for checking, and different EC ratios (sum of a quantity of data pieces and an amount of redundant data) correspond to different algorithms. The EC ratios may include EC4+2, EC3+3, EC8+2, and the like. In this case, the checking algorithm may be algorithms corresponding to different EC ratios. In this embodiment, the checking algorithm is not limited.

In this embodiment, the redundant data calculation unit 2102 performs calculation for checking the to-be-processed data to obtain the redundant data corresponding to the to-be-processed data in, but not limited to, the following two manners:

First Calculation Manner:

The redundant data calculation unit 2102 performs, based on a preset checking algorithm, calculation for checking the to-be-processed data to obtain the redundant data corresponding to the to-be-processed data.

In an example, before the storage system 200 is used, a RAID level may be configured for the storage system 200 by a technician based on an actual requirement on use, and a checking algorithm corresponding to RAID 6 is programmed in the redundant data calculation unit 2102. In this way, after obtaining the to-be-processed data, the redundant data calculation unit 2102 performs calculation for checking based on the checking algorithm.

The foregoing example is further used. The preset checking algorithm is an algorithm corresponding to RAID 6. After obtaining the to-be-processed data (the 8-KB data), the redundant data calculation unit 2102 splits the to-be-stored data into four data pieces based on the preset algorithm corresponding to RAID 6, where a size of each data piece is 2 KB; and based on the algorithm, calculates the four data pieces to obtain redundant data 1 and redundant data 2 that both have a size of 1 KB.

In the first calculation manner, the redundant data calculation unit 2102 uses the same checking algorithm to perform calculation for checking any piece of to-be-processed data, that is, only one RAID level can be implemented by using the entire storage apparatus. To improve flexibility of storing data in the storage system 200, this embodiment provides a second calculation manner as follows:

Second Calculation Manner:

Before the redundant data calculation unit 2102 performs calculation for checking the to-be-processed data, the processor 2101 may send, to the redundant data calculation unit 2102, first information used to indicate a checking algorithm. The redundant data calculation unit 2102 pre-stores a plurality of checking algorithms After receiving the first information, the redundant data calculation unit 2102 performs calculation for checking the to-be-processed data based on the checking algorithm indicated by the first information to obtain corresponding redundant data.

In this manner, the processor 2101 may determine, according to a preset rule, the checking algorithm corresponding to the to-be-processed data, where the preset rule may be used to determine, based on attribute information of the to-be-processed data, for example, a data size or a service type of the data, the checking algorithm corresponding to the to-be-processed data. In an example, the preset rule may be that if the data size of the to-be-processed data is greater than 5 KB, the checking algorithm corresponding to RAID 6 is used; otherwise, a checking algorithm corresponding to RAID 3 is used. The processor 2101 determines that the data size of the to-be-processed data is 8 KB, which is greater than 5 KB, so that the processor 2101 determines that the checking algorithm of the to-be-processed data is the algorithm corresponding to RAID 6, and then indicates the determined checking algorithm to the redundant data calculation unit 2102 by using the first information. The first information may carry an identifier of a checking algorithm, and the identifier may be a RAID level, a number of the checking algorithm, or the like. After receiving the first information, the redundant data calculation unit 2102 determines that the identifier of the checking algorithm carried in the first information is an identifier of the algorithm corresponding to RAID 6 and performs calculation for checking the to-be-processed data based on the algorithm corresponding to RAID 6. A calculation process may be similar to that in the first calculation manner. Details are not described herein again.

It should be noted that, if the redundant data calculation unit 2102 obtains the to-be-processed data from the cache unit 2103 according to the second instruction sent by the processor 2101, the second instruction and a first information may be a same instruction or may be two independent instructions. This is not limited herein.

In addition, it should be noted that the checking algorithm is associated with redundant units of a plurality of storage devices in the storage apparatus 220. The redundant units may be understood as a group of storage devices required to implement a RAID level or may also be referred to as a RAID group. For example, for RAID 3, it is required that two storage devices separately store two data pieces and one storage device stores redundant data. In this case, the three storage devices form one redundant unit (or RAID group). If a plurality of storage devices includes only one redundant unit, the redundant data calculation unit 2102 may be configured to calculate the redundant data of the to-be-processed data in the first calculation manner. If a plurality of storage devices includes a plurality of redundant units, that is, RAID groups, and the plurality of redundant units use different checking algorithms, the redundant data calculation unit 2102 may be configured to calculate the redundant data of the to-be-processed data in the second calculation manner. In this case, that the redundant data calculation unit 2102 calculates the redundant data of the to-be-processed data may be understood as that the redundant data calculation unit 2102 calculates redundant data for to-be-processed data in a plurality of redundant units in the storage apparatus 220.

In FIG. 2A, because a plurality of storage devices of the storage apparatus 220 are directly connected to the processor 2101, the processor 2101 may configure redundant units corresponding to the plurality of storage devices based on a requirement on use. For example, if the storage apparatus 220 includes six storage devices, the processor 2101 may configure the six storage devices to form one redundant unit or may configure the six storage devices to be grouped into a plurality of RAID groups. For example, the first two storage devices may be grouped into a first RAID group while the remaining four storage devices may be grouped into a second RAID group. In this embodiment, division of the plurality of storage devices into RAID groups is uniformly managed by the processor 2101 based on a requirement on use and does not need to use the redundant data calculation unit 2102, so that functions of all the RAID groups in the storage system 200 can be implemented.

S34: The redundant data calculation unit 2102 stores the redundant data in the cache unit 2103.

After obtaining the redundant data through calculation, the redundant data calculation unit 2102 may sequentially store the redundant data in the cache unit 2103. For example, if the redundant data 1 and the redundant data 2 are obtained through calculation, and the size of each piece of the redundant data is 1 KB, the redundant data 1 is stored in the ninth storage unit (denoted as a storage unit 8) of the cache unit 2103, and the redundant data 2 is stored in the tenth storage unit (denoted as a storage unit 9) of the cache unit 2103.

In this embodiment, after the redundant data calculation unit 2102 calculates the redundant data of the to-be-processed data, the following steps may be further included:

S35: The processor 2101 stores the to-be-processed data and the redundant data in the storage apparatus 220.

After storing the redundant data obtained through calculation in the cache unit 2103, the redundant data calculation unit 2102 may send a calculation complete instruction to the processor 2101, where the calculation complete instruction may carry a storage address in the cache unit 2103 and a data length of the redundant data, which includes, for example, an offset in the storage address that is 9, and the data length that is 2. After receiving the calculation complete instruction, the processor 2101 stores the to-be-processed data and the redundant data in the storage apparatus 220.

Figure 4:
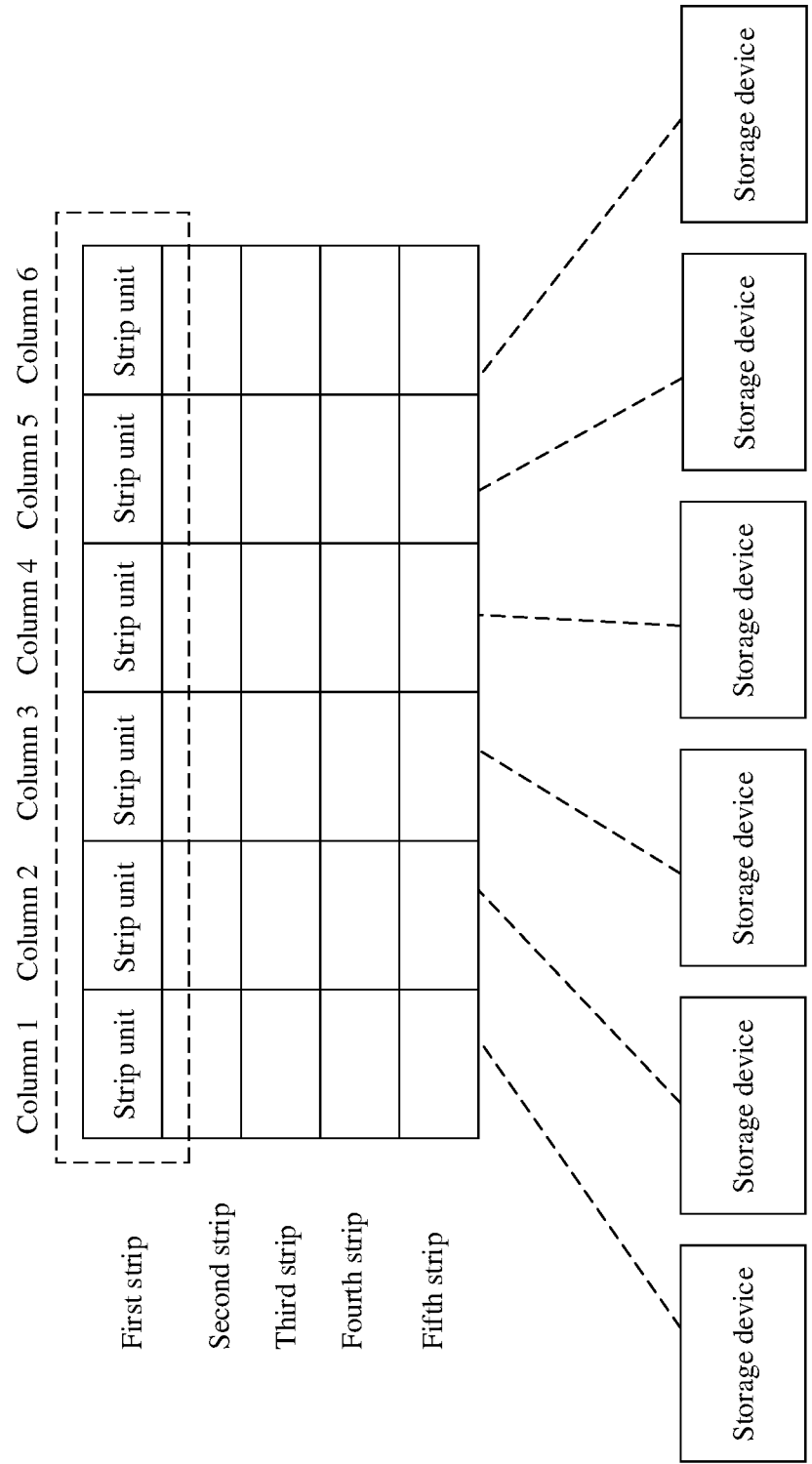
FIG. 4 is a schematic diagram of an example of a partition used to store data according to an embodiment.

In an example, the processor 2101 may store data based on partitions in the storage apparatus 220. For example, the processor 2101 groups a plurality of storage devices in the storage apparatus 220 into one redundant unit. For example, referring to FIG. 4, the six storage devices form one redundant unit, and a RAID level of the redundant unit is RAID 6. The processor 2101 creates several partitions (pt). Each pt includes six columns, and one column may be considered as one logical storage area. Then, columns of the several pts separately correspond to the six storage devices in the storage system according to a balancing policy of the storage system. Each pt includes a plurality of strips, each strip includes a plurality of strip units, and a total quantity of the plurality of strip units is the same as a quantity of columns included in the pt. In the foregoing example, one pt includes six columns, so that each strip in the pt includes six strip units. Storage space occupied by all strip units is the same, and each strip unit is mapped to one column. For example, the first strip unit of each strip is mapped to a storage device (the first storage device) corresponding to a column 1, the second strip unit is mapped to a storage device (the second storage device) corresponding to a column 2, and so on.

In this way, when the processor 2101 stores the to-be-processed data and the redundant data, the processor 2101 selects one partition from the several partitions, obtains strips from the partition, and then separately stores the data in corresponding storage devices based on a mapping relationship between the partition and the storage devices.

In this embodiment, the processor 2101 separately stores the to-be-processed data and the redundant data in corresponding storage devices in, but not limited to, the following two manners:

In a first storage manner, the processor 2101 completes the data storage process.

The processor 2101 obtains a strip used to store the to-be-processed data and the redundant data, for example, the first strip of the first partition, and determines to sequentially store the to-be-processed in storage devices corresponding to the first four columns in the first strip and separately store the redundant data in a storage device corresponding to the fifth column and a storage device corresponding to the sixth column. Then, the processor 2101 transfers corresponding data to the corresponding storage devices based on storage addresses of the to-be-processed data and the redundant data in the cache unit 2103 and data lengths of the to-be-processed data and the redundant data.

In a second storage manner, a direct memory access (DMA) engine completes the data storage process.

After receiving the calculation complete instruction sent by the redundant data calculation unit 2102, the processor 2101 sends a storage instruction to the storage apparatus 220, where the storage instruction includes a storage address of the to-be-processed data in the cache unit 2103 and a storage address of the redundant data in the cache unit 2103. After receiving the storage instruction, the direct memory access DMA engine of the storage apparatus 220 obtains, based on the storage addresses indicated by the storage instruction, the to-be-processed data and the redundant data from corresponding storage space.

In an example, each storage device may include one DMA engine. In this case, after receiving the calculation complete instruction, the processor 2101 may determine, based on the strip, the storage devices that are respectively configured to store the to-be-processed data and the redundant data. For example, the processor 2101 may determine, based on a mapping relationship between the strip and the storage devices, to store to-be-processed data stored in a storage unit 0 and a storage unit 1 that are in the cache unit 2013 in the first storage device, store to-be-processed data stored in a storage unit 2 and a storage unit 3 that are in the cache unit 2013 in the second storage device, and so on, until all the to-be-processed data is stored separately in the first four storage devices; and determine to store redundant data 1 stored in a storage unit 8 in the fifth storage device and store redundant data 1 stored in a storage unit 9 in the fifth storage device. Then, the processor sends a corresponding storage instruction to the DMA engine of each storage device, where the storage instruction carries a storage address of data that needs to be stored in the storage device. For example, a storage address included in a storage instruction sent to a DMA engine of the first storage device includes an offset of 0 and a length of 2; a storage address included in a storage instruction sent to a DMA engine of the second storage device includes an offset of 2 and a length of 2; and so on. Descriptions are not provided herein.

S36: The processor 2101 sends a release instruction to the cache unit 2103.

After the to-be-processed data and the redundant data are stored in the storage devices included in the storage apparatus 220, the processor may send the release instruction to the cache unit 2103, and the cache unit 2103 releases, according to the release instruction, storage space corresponding to the to-be-processed data and the redundant data. Step S36 is an optional step and is indicated with a dashed line in FIG. 3.

In the foregoing solution, the processor can directly store the to-be-processed data in the cache space of the redundant data calculation unit, so that steps for storing the to-be-processed data in a memory of the processor and transferring the to-be-processed data from the memory to the cache space are reduced, thereby streamlining a procedure of calculation for checking and decreasing a processing delay.

In some embodiments, the data stored in the storage apparatus 220 may be lost due to a fault occurred in the storage device in sending or another cause. In this embodiment, the lost data may be further recovered. A process is as follows:

S37: When determining that target data stored in the storage apparatus 220 is lost, the processor 2101 stores remaining data corresponding to the target data in the storage space corresponding to the cache unit 2103.

In an example, the processor 2101 may periodically send verification information to the storage device, where the verification information may be an empty packet or a data packet with a packet header; and determine, based on the verification information, whether a fault occurs in the storage device. If the processor 2101 does not receive, within a preset time, feedback information of the storage device to the verification information, the processor 2101 may determine that a fault occurs in the storage device. Data stored in the faulty storage device is the target data.

For example, if the processor 2101 determines that a fault occurs in the first storage device, data stored in the first storage device is the target data. The foregoing example is further used. The processor 2101 uses the first strip of the first pt to store the to-be-processed data and the redundant data, so that the processor 2101 stores, in the storage space of the cache unit 2103, data that corresponds to the first strip and that is stored in each of the other storage devices (that is, the second storage device to the sixth storage device), and the data that corresponds to the first strip and that is stored in each of the other storage devices is the remaining data.

A manner in which the processor 2101 stores, in the storage space of the cache unit 2103, the data that corresponds to the first strip and that is stored in each of the other storage devices may be implemented by the processor 2101; or the processor 2101 may send a storage instruction to each storage device, and a DMA engine of each storage device stores corresponding data in the storage space of the cache unit 2103. An embodiment may be similar to that in step S35 and details are not described herein again.

The processor 2101 may obtain a storage address of the remaining data in the cache unit 2103, for example, the storage address includes an offset of 0 and a length of 8.

S38: The redundant data calculation unit 2102 performs calculation for checking the remaining data to obtain the target data and stores the target data in the storage space corresponding to the cache unit 2103.

After storing the remaining data in the storage space corresponding to the cache unit 2103, the processor 2101 may send a third instruction to the redundant data calculation unit 2102, to instruct the redundant data calculation unit 2102 to perform calculation for checking the remaining data. The third instruction may include the storage address of the remaining data in the cache unit 2103. For example, the storage address includes an offset of 0 and a length of 8. After receiving the third instruction, the redundant data calculation unit 2102 obtains the remaining data based on the storage address in the third instruction. Then, calculation for checking is performed on the remaining data. For example, the checking algorithm corresponding to RAID 6 is used to calculate the remaining data, to obtain the target data. The target data is then stored in the storage space of the cache unit 2103. For example, the target data is stored in the storage unit 8.

S39: The processor 2101 stores the remaining data and the target data in the storage apparatus 220.

After obtaining the target data through calculation, the redundant data calculation unit 2102 may send a calculation complete instruction to the processor 2101, where the calculation complete instruction includes a storage address of the target data in the cache unit 2103. Then, the processor 2101 may determine whether the first storage device in which a fault occurred is restored to normal, and if the first storage device is restored to normal, the target data obtained through calculation by the redundant data calculation unit 2102 may be stored in the first storage device; or if the first storage device is still faulty, the processor 2101 may reselect a strip to store the remaining data and the target data, so that the remaining data and the target data are stored in a storage device corresponding to the new strip.

In the foregoing solution, after data is lost, the lost data may be further recovered in the foregoing manner, and the processing is relatively simple, so that a processing delay can be decreased.

In addition, in this embodiment, after the processor 2101 stores data in a storage device included in the storage apparatus 220, the processor 2101 may obtain, from the storage device based on the data reading request sent by the client, data corresponding to the data reading request, and feed back the data to the client. For example, the processor 2101 receives the data reading request sent by the client, where the data reading request includes an identifier of to-be-read data (for example, a name or storage address of the to-be-read data). Then, the processor 2101 may request the memory or the cache unit 2103 for corresponding storage space based on a data size of the to-be-read data, and then store, based on the storage address of the to-be-read data, the to-be-read data in the storage space obtained from the memory or the cache unit 2103, to feed back the to-be-read data to the client. A process may be similar to that in the conventional technology, so descriptions are not provided herein. In an embodiment that does not comply with the conventional technology, because the processor 2101 may directly access the cache unit 2103, the to-be-read data obtained by the processor 2101 may be stored in the memory, or may be stored in the cache unit 2103.

It should be noted that, according to the embodiment shown in FIG. 3, in a scenario with a storage array, the method is performed by an array controller for a storage array, or in a scenario with a distributed storage system, may be performed by a storage node or a client in a distributed storage system. In another scenario, the method is performed by a device or an apparatus having a same function as the storage node or the array controller. Descriptions are not provided herein.

In the foregoing embodiment, to implement functions in the method provided in the embodiments, the storage system may include a hardware structure and/or a software module, and the functions are implemented by the hardware structure, the software module, or the hardware structure in combination with the software module. Whether one of the foregoing functions is performed by the hardware structure, the software module, or the hardware structure in combination with the software module depends on the solution.

Figure 5:
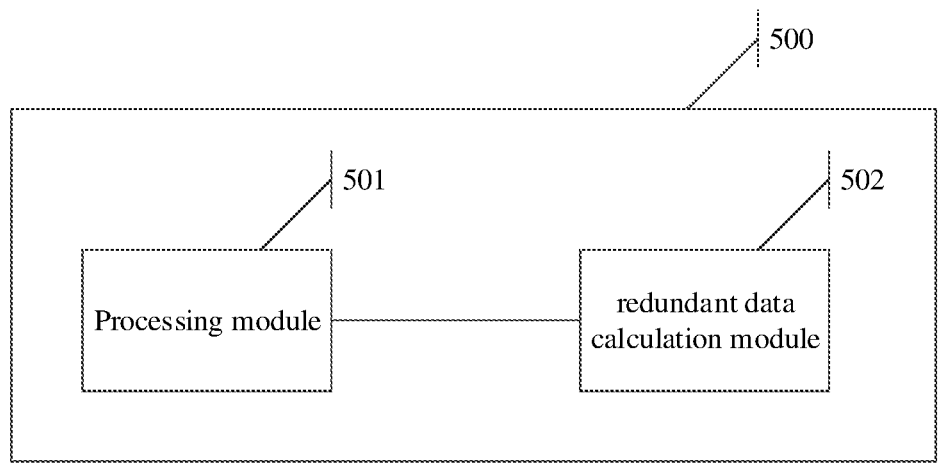
FIG. 5 is a schematic structural diagram of an example of a redundant data calculation apparatus according to an embodiment.

FIG. 5 is a schematic structural diagram of a redundant data calculation apparatus 500. The redundant data calculation apparatus 500 may be configured to implement a function of a storage node in a distributed storage system or may be configured to implement a function of an array controller in a storage array. The redundant data calculation apparatus 500 may be a hardware structure, a software module, or a hardware structure in combination with a software module. The redundant data calculation apparatus 500 may be implemented by a chip system. In this embodiment, the chip system may include a chip, or may include a chip and another discrete component.

The redundant data calculation apparatus 500 may include a processing module 501 and a redundant data calculation module 502.

The processing module 501 may be configured to perform steps S31, S32, S35 to S37, and step S39 in the embodiment shown in FIG. 3, and/or be configured to support another process.

The redundant data calculation module 502 may be configured to perform steps S33, S34, and step S38 in the embodiment shown in FIG. 3, and/or be configured to support another process.

Reference may be made to all related content of the steps in the foregoing method embodiment for function descriptions of corresponding functional modules, and details are not described herein again.

Division into the modules in the embodiment shown in FIG. 5 is an example and is merely logical function division. During actual implementation, another division manner may be used. In addition, the functional modules in the embodiments may be integrated in one processor or may exist as physically independent. Alternatively, two or more modules may be integrated into one module. The integrated module may be implemented in a form of hardware or may be implemented in a form of a software functional module.

Figure 6:
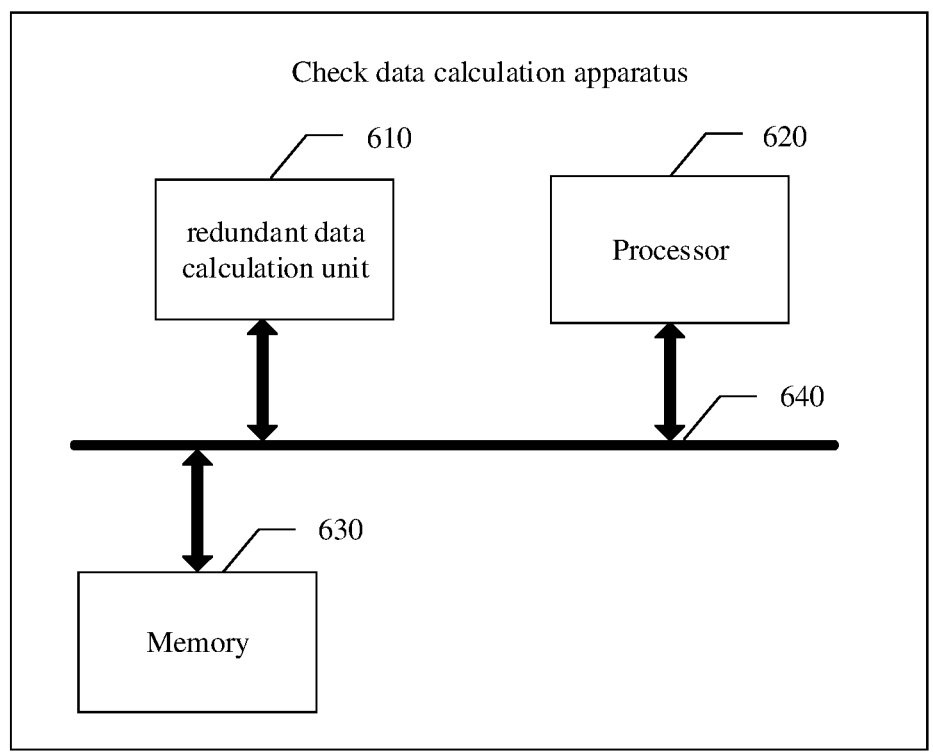
FIG. 6 is a schematic structural diagram of another example of a redundant data calculation apparatus according to an embodiment.

FIG. 6 shows a redundant data calculation apparatus 600 according to an embodiment. The redundant data calculation apparatus 600 may be configured to implement a function of a storage node in a distributed storage system or may be configured to implement a function of an array controller in a storage array. The redundant data calculation apparatus 600 may be a chip system. In this embodiment, the chip system may include a chip, or may include a chip and another discrete component.

The redundant data calculation apparatus 600 includes at least one processor 620, configured to implement or support the redundant data calculation apparatus 600 in implementing a function of the processor in the method provided in the embodiments. For example, the processor 620 may determine to store to-be-processed data in cache space of a redundant data calculation unit. For details, refer to detailed descriptions in the method example. Details are not described herein again.

The redundant data calculation apparatus 600 may further include at least one memory 630, configured to store program instructions and/or data. The memory 630 is coupled to the processor 620. Coupling in the embodiments is indirect coupling or a communication connection between apparatuses, units, or modules, may be electrical, mechanical, or in another form, and is used for information exchange between apparatuses, units, or modules. The processor 620 may cooperate with the memory 630. The processor 620 may execute the program instructions stored in the memory 630. At least one of the at least one memory may be included in the processor.

The redundant data calculation apparatus 600 may further include a redundant data calculation unit 610, where the redundant data calculation unit 610 may be a RAID card and is configured to calculate redundant data. Alternatively, the redundant data calculation unit 610 may be a graphics processing unit (GPU), a dedicated chip, or the like. This is not limited in this embodiment.

A connection medium between the redundant data calculation unit 610, the processor 620, and the memory 630 is not limited in this embodiment. In the embodiment shown in FIG. 6, the memory 630, the processor 620, and the redundant data calculation unit 610 are connected through a bus 640. The bus may be a bus that uses a data consistency protocol for communication. The bus is indicated by a thick line in FIG. 6. A connection manner between other components is merely described as an example, but not as a limitation. The bus may be classified into an address bus, a data bus, a control bus, and the like. For ease of representation, only one thick line is used to represent the bus in FIG. 6, but this does not mean that there is only one bus or only one type of bus.

In the embodiments, the processor 620 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments. The general-purpose processor may be a microprocessor or any conventional processor. The steps of the method disclosed with reference to the embodiments may be directly performed by a hardware processor or may be performed by using a combination of hardware in the processor and a software module.

In this embodiment, the memory 630 may be a non-volatile memory, for example, a hard disk drive (HDD) or a solid state-drive (SSD), or may be a volatile memory such as a random access memory (RAM). The memory is, but is not limited to, any other medium capable of carrying or storing expected program code in the form of instructions or data structures and capable of being accessed by a computer. The memory in this embodiment may alternatively be a circuit or any other apparatus that can implement a storage function and is configured to store program instructions and/or data.

An embodiment further provides a computer-readable storage medium including instructions. When the instructions are run on a computer, the computer is enabled to perform the method performed by the redundant data calculation apparatus in the embodiment shown in FIG. 3.

An embodiment further provides a computer program product including instructions. When the instructions are run on a computer, the computer is enabled to perform the method performed by the redundant data calculation apparatus in the embodiment shown in FIG. 3.

An embodiment provides a chip system, where the chip system includes a processor, may further include a memory, and is configured to implement a function of the redundant data calculation apparatus in the foregoing method. The chip system may include a chip or may include a chip and another discrete component.

An embodiment provides a storage system, where the storage system includes the redundant data calculation apparatus in the embodiment shown in FIG. 3.

All or some of the methods in the embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments are all or partially generated. The computer may be a general-purpose computer, a dedicated computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

What is claimed is:

1. A redundant data calculation method, applied to a redundant data calculation apparatus, wherein the redundant data calculation apparatus comprises a processor and a redundant data calculator, and the method comprises:
    obtaining, by the processor, to-be-processed data;
    storing the to-be-processed data in cache space of the redundant data calculator, wherein the redundant data calculator is configured to directly obtain the to-be-processed data from the processor; and
    obtaining, by the redundant data calculator, the to-be-processed data from the cache space; and
    performing calculations for checking the to-be-processed data to obtain redundant data corresponding to the to-be-processed data.

2. The method according to claim 1, wherein performing the calculations for checking the to-be-processed data to obtain redundant data corresponding to the to-be-processed data further comprises:
    sending, by the processor, first information to the redundant data calculator, wherein the first information is used to indicate a checking algorithm; and
    performing, by the redundant data calculator based on the checking algorithm indicated by the first information, calculation for checking the to-be-processed data to obtain the redundant data.

3. The method according to claim 1, wherein the redundant data calculation apparatus further comprises a storage apparatus, and the method further comprises:
    storing, by the processor, the to-be-processed data, and the redundant data in the storage apparatus.

4. The method according to claim 3, wherein the storing, by the processor, the to-be-processed data and the redundant data in the storage apparatus further comprises:
    sending, by the processor, a storage instruction to the storage apparatus, wherein a direct memory access (DMA) engine of the storage apparatus obtains the to-be-processed data and the redundant data from the cache space.

5. The method according to claim 3, further comprising:
    when the processor determines that target data stored in the storage apparatus is lost, storing, by the processor, remaining data corresponding to the target data in the cache space;
    performing, by the redundant data calculator, calculation for checking the remaining data to obtain the target data, and storing the target data in the cache space; and
    storing, by the processor, the remaining data and the target data in the storage apparatus.

6. The method according to claim 1, wherein the cache space consumes a part of memory of the processor.

7. The method according to claim 1, wherein the processor and the redundant data calculator communicate with each other through a data consistency protocol.

8. The method according to claim 1, wherein the redundant data calculator further calculates redundant data for to-be-processed data in a plurality of redundant units in the storage apparatus, wherein checking algorithms used by the plurality of redundant units are different.

9. A redundant data calculation apparatus, comprising a processor and a redundant data calculator, wherein the processor is configured to:
obtain to-be-processed data, and
store the to-be-processed data in cache space of the redundant data calculator; and the redundant data calculator is configured to:
obtain the to-be-processed data from the cache space, wherein the redundant data calculator is configured to directly obtain the to-be-processed data from the processor and
perform calculations for checking the to-be-processed data to obtain redundant data corresponding to the to-be-processed data.

10. The apparatus according to claim 9, wherein the redundant data calculator is further configured to:
the processor is further configured to send first information to the redundant data calculator, wherein the first information is used to indicate a checking algorithm; and
the redundant data calculator is configured to perform, based on the checking algorithm indicated by the first information, the calculations for checking the to-be-processed data to obtain the redundant data.

11. The apparatus according to claim 9, wherein the redundant data calculation apparatus further comprises a storage apparatus, and the processor is further configured to store the to-be-processed data and the redundant data in the storage apparatus.

12. The apparatus according to claim 11, wherein the processor is further configured to:
send a storage instruction to the storage apparatus, wherein a direct memory access DMA engine of the storage apparatus obtains the to-be-processed data and the redundant data from the cache space.

13. The apparatus according to claim 11, wherein the processor is further configured to:
when determining that target data stored in the storage apparatus is lost, store remaining data corresponding to the target data in the cache space;
the redundant data calculator is further configured to perform calculation for checking the remaining data to obtain the target data, and store the target data in the cache space; and the processor is further configured to store the remaining data and the target data in the storage apparatus.

14. The apparatus according to claim 9, wherein the cache space consumes a part of memory of the processor.

15. The apparatus according to claim 9, wherein the processor and the redundant data calculator communicate with each other through a data consistency protocol.

16. The apparatus according to claim 9, wherein the redundant data calculator is further configured to:
calculate redundant data for to-be-processed data in a plurality of redundant units in the storage apparatus, wherein checking algorithms used by the plurality of redundant units are different.

17. A non-transitory computer-readable medium storing instructions, wherein, when the instructions are run on a computer, the computer is enabled to perform a redundant data calculation method comprising:
obtain to-be-processed data;
storing the to-be-processed data in cache space of the redundant data calculator, wherein the redundant data calculator is configured to directly obtain the to-be-processed data from the processor;
obtaining the to-be-processed data from the cache space; and
performing calculations for checking the to-be-processed data to obtain redundant data corresponding to the to-be-processed data.

18. The non-transitory computer-readable medium according to claim 17, wherein performing the calculations for checking the to-be-processed data to obtain redundant data corresponding to the to-be-processed data further comprises:
send first information to the redundant data calculator, wherein the first information is used to indicate a checking algorithm; and
perform based on the checking algorithm indicated by the first information, calculation for checking the to-be-processed data to obtain the redundant data.

19. The non-transitory computer-readable medium according to claim 17, wherein the redundant data calculation apparatus further comprises a storage apparatus, and the method further comprises:
storing the to-be-processed data and the redundant data in the storage apparatus.

20. The non-transitory computer-readable medium according to claim 19, wherein the storing, by the processor, the to-be-processed data and the redundant data in the storage apparatus further comprises:
sending a storage instruction to the storage apparatus, wherein a direct memory access (DMA) engine of the storage apparatus obtains the to-be-processed data and the redundant data from the cache space.

* * * * *